United States Patent
Mulla et al.

(10) Patent No.: US 7,159,046 B2
(45) Date of Patent: Jan. 2, 2007

(54) METHOD AND APPARATUS FOR CONFIGURING COMMUNICATION BETWEEN DEVICES IN A COMPUTER SYSTEM

(75) Inventors: Dean A Mulla, Saratoga, CA (US); Keith R. Pflederer, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/881,326

(22) Filed: Jun. 29, 2004

(65) Prior Publication Data

US 2005/0289250 A1    Dec. 29, 2005

(51) Int. Cl.
*G06F 3/00* (2006.01)
*G06F 13/00* (2006.01)
*G06F 13/38* (2006.01)
*G11C 7/10* (2006.01)

(52) U.S. Cl. .......................... 710/9; 710/104
(58) Field of Classification Search ............... 710/9, 710/104, 10, 305, 52, 313, 314, 240; 718/100; 711/100; 326/38, 39, 41; 712/32, 36; 361/679, 361/683, 686
See application file for complete search history.

(56) References Cited

U.S. PATENT DOCUMENTS

| | | | | |
|---|---|---|---|---|
| 5,812,803 A | * | 9/1998 | Pawlowski et al. | 710/305 |
| 6,262,596 B1 | * | 7/2001 | Schultz et al. | 326/41 |
| 6,915,365 B1 | * | 7/2005 | Creta et al. | 710/104 |
| 2004/0133727 A1 | * | 7/2004 | Scordalakes | 710/305 |
| 2005/0289250 A1 | * | 12/2005 | Mulla et al. | 710/9 |
| 2006/0034111 A1 | * | 2/2006 | Pawlowski | 365/100 |
| 2006/0095601 A1 | * | 5/2006 | Wang et al. | 710/14 |

OTHER PUBLICATIONS

"A flexible compatible PCI interface for nuclear experiments" by Saleh et al. (abstract only). Publication Date: Jun. 1998.*

* cited by examiner

*Primary Examiner*—Gopal C. Ray
(74) *Attorney, Agent, or Firm*—Schwegman, Lundberg, Woessner & Kluth, P.A.

(57) ABSTRACT

A control hub includes a first interface and a second interface to transfer data. The first interface connects to a first bus. The second interface connects to a peripheral bus. The control hub receives configuration address and configuration data during a configuration access. The control hub transfers the configuration data between the first interface and the second interface without transferring the configuration data to a configuration data register. The control hub further includes other interfaces to allow access to peripheral devices for system management and testing purposes.

11 Claims, 5 Drawing Sheets

Fig. 5 ably to practice the invention. Other
METHOD AND APPARATUS FOR CONFIGURING COMMUNICATION BETWEEN DEVICES IN A COMPUTER SYSTEM

FIELD

Embodiments of the present invention relate generally to data processing systems, more particularly, to computer systems having a control hub to allow communication between devices in a computer system.

BACKGROUND

A typical computer has many devices such as a processor, a display terminal, a keyboard, a mouse, a floppy disk drive, a memory, a network card, and other peripheral devices.

Some devices in a computer are unable to communicate directly with each others because of incompatibility in design. Therefore, a typical computer may have an intermediate controller or a control hub to allow indirect communication between the devices. The indirect communication usually requires the control hub to perform many separate steps to complete one transaction or one access between two devices.

Completing an access in many steps may consume more time than necessary. Further, some peripheral devices in a computer may have a particular type of address identified by many address bits. Therefore, designing an interface to access these peripheral devices for purposes such as system management and testing may require excessive pin counts for the interface.

DESCRIPTION OF EMBODIMENTS

The following description and the drawings illustrate specific embodiments of the invention sufficiently to enable those skilled in the art to practice the invention. Other embodiments may incorporate structural, logical, electrical, process, and other changes. In the drawings, like numerals describe substantially similar components throughout the several views. Examples merely typify possible variations. Portions and features of some embodiments may be included in or substituted for those of others. The scope of the invention encompasses the full ambit of the claims and all available equivalents.

Figure 1:
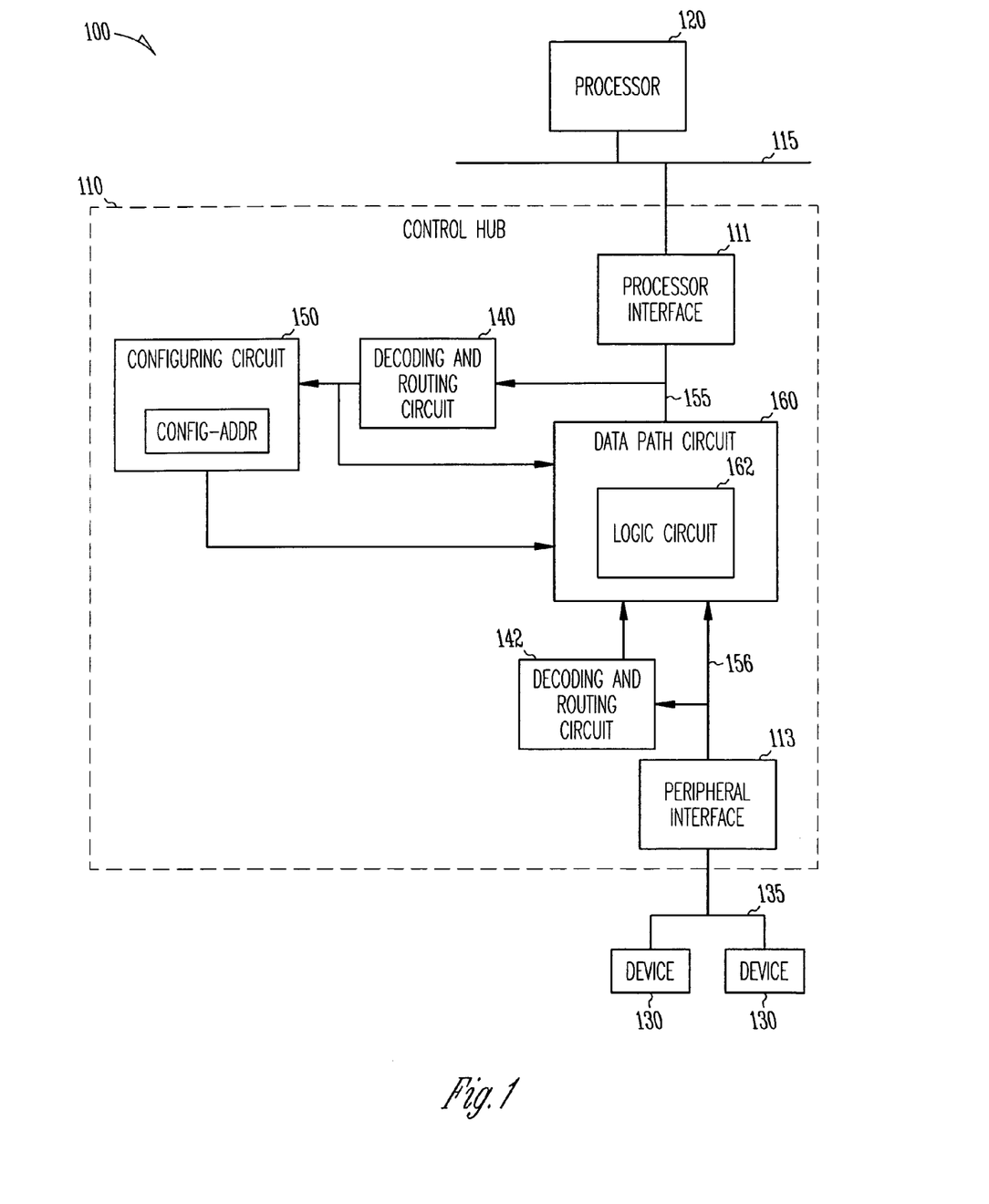
FIG. 1 shows a system having a control hub.

FIG. 1 shows a system 100 including a control hub 110. Control hub 110 connects to a processor 120 via a processor bus 115. Control hub 110 also connects to a number of devices 130 via a peripheral bus 135. Control hub 110 controls the transfer of data between processor 120 and devices 130. In this specification, the term information or the term data includes address information, data information, or control information, or a combination thereof.

In some embodiments, each of the devices 130 is assigned a configuration address during a configuration routine of system 100. Control hub 110 allows communication between processor 120 with a peripheral device 130 based on the assigned configuration address.

Peripheral bus 135 may be a Peripheral Component Interconnect (PCI) bus. Examples of a PCI bus include a traditional PCI bus, a PCI-X bus, a PCI Express bus, and any variant of these PCI buses. Specifications for these PCI buses are published by Peripheral Component Interconnect Special Interest Group (PCI-SIG). The PCI-SIG published various versions for the specifications for the traditional PCI bus such as the PCI specification version 1.0 (1992), version 2.0 (1993), version 2.1 (1995), version 2.2 (1999) and other updated PCI specification versions. The PCI-SIG also published various versions for the specifications for the PCI-X bus such as the PCI-X 2.0 (2002). The PCI-SIG further published specifications for the PCI Express bus such as the PCI Express Base Specification Revision 1.0 and PCI Express Card Electromechanical Specification Revision 1.0, both published by the PCI Special Interest Group (PCI-SIG), dated Jul. 22, 2002.

Devices 130 may be PCI devices. Control hub 110 may be configured to transfer data via peripheral bus 135 according to any one of the PCI bus specifications described above. In this specification, the term PCI refers to any one of the traditional PCI, PCI-X, and PCI Express discussed above. Thus, term PCI bus refers to any one of the traditional PCI, PCI-X, and PCI buses. The term PCI specification refers to any one of the traditional PCI, PCI-X, and PCI specifications discussed above.

Control hub 110 includes a processor interface 111 and a peripheral interface 113. Each of the interfaces 111 and 113 may include a number of connection points (e.g., terminals, pins, or solder ball contacts) to transfer data. Processor interface 111 transfers address information, data information, and control information between control hub 110 and processor 120. Peripheral interface 113 transfers address information, data information, and control information between control hub 110 and devices 130.

Control hub 110 also includes a first decoding and routing circuit 140, a second decoding and routing circuit 142, a configuration circuit 150, and a data path circuit 160 connected to processor interface 111 via data path 155 and to peripheral interface 113 via data path 156.

First decoding and routing circuit 140 decodes data received from interface 111 and routes the decoded data to other circuits within control hub 110 such as configuration circuit 150 and data path circuit 160. Second decoding and routing circuit 142 decodes data received from peripheral interface 113 and routes the decoded data to other circuits within control hub 110 such as data path circuit 160.

Data path circuit 160 includes a logic circuit 162 to enable the transfer of data between processor 120 and devices 130. In some embodiments, data path circuit includes a pipeline such as a cache pipeline to propagate data between processor interface 111 and peripheral interface 113.

Configuration circuit 150 includes a configuration address register (CONFIG_ADDR) 152 to store a configuration address decoded by decoding and routing circuit 140. In some embodiments, the configuration address contains configuration information such as bus number, device number, function number, and register number according to the PCI specification mentioned above. In some embodiments, CONFIG_ADDR register 152 corresponds to an input/output (I/O) port of processor 120 in which the I/O port has an I/O address starting at address 0CF8h (hexadecimal) in the I/O address space of processor 120.

Control hub 110 may include an internal configuration address space in which each internal configuration register (e.g., CONFIG_ADDR register 152) in control hub 110 occupies an exclusive internal configuration address. Thus, each internal configuration address (assigned to each internal configuration register) may also contain information such as bus number, device number, function number, and register number. Therefore, in some embodiments, decoding and routing circuit 140 uses the assigned internal configuration address to route data to the appropriate configuration register such as CONFIG_ADDR register 152.

In some embodiments, control hub 110 performs a configuration access to allow processor 120 to indirectly accesses devices 130. The configuration access includes a configuration read access and a configuration write access. The configuration read access reads configuration data from devices 130. The configuration write access writes configuration data to devices 130. In some embodiments, processor 120 issues an input output (I/O) access corresponding to the configuration access to access devices 130. Control hub 110 translates the I/O access into the configuration access. Subsequently, control hub 110 performs the configuration access and returns the results of the configuration access to processor 120.

In a configuration access, control hub 110 processes configuration information including configuration address and configuration data. The configuration address identifies a peripheral device. Control hub 110 writes or reads the configuration data to or from the peripheral device identified by the configuration address.

For example, if control hub 110 performs a configuration access to allow communication between processor 120 and one of the devices 130, processor 120 provides the configuration address to control hub 110. Control hub 110 stores the configuration address into CONFIG_ADDRESS register 152. Among the devices 130, the device that corresponds to the configuration address is called a target device (the target device 130). Subsequently, control hub 110 performs the configuration access to communicate with the target device 130 identified by the configuration address stored in CONFIG_ADDRESS register 152.

In the example above, if the configuration access is a configuration write access, control hub 110 receives configuration data from processor 120. If the configuration access is a configuration read access, control hub 110 receives configuration data from the peripheral device 130.

Regardless of whether the configuration access is the configuration read or the configuration write access, control hub 110 does not store the configuration data into a separate register. For example, control hub 110 does not store the configuration data into a register such as the CONFIG_DATA register according to the PCI specification. In the example above, data path circuit 160 of control hub 110 propagates the configuration data directly between interface 111 and peripheral interface 113 without storing the configuration data into a separate register such as the CONFIG_DATA register. Logic circuit 162 of data path circuit 160 is configured to initiate a configuration access to the target device 130 while the configuration data is propagated on the pipeline such that the configuration data is passed directly between processor interface 111 and peripheral interface 113.

Figure 2:
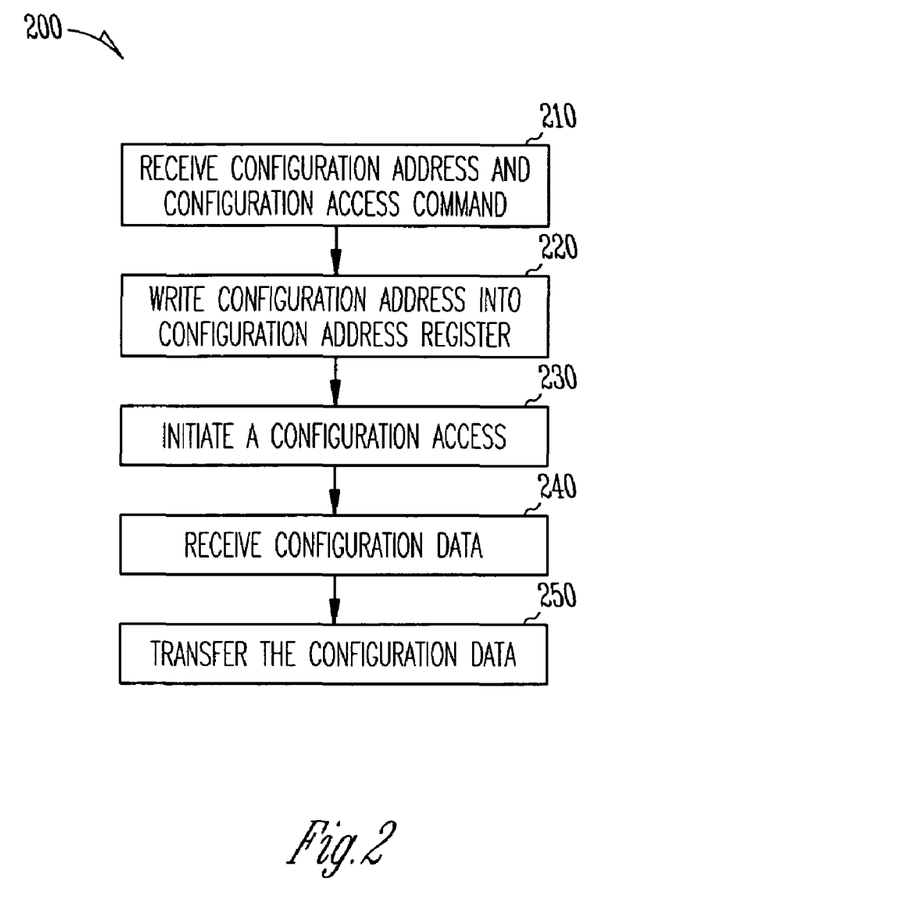
FIG. 2 is a flowchart of a method of transferring data.

FIG. 2 is a flowchart of a method of transferring data. Method 200 describes a method transferring data in system 100 of FIG. 1 in which control hub 110 controls the transfer of data between processor 120 and one of the devices 130 (the target device 130).

Box 210 receives a configuration address and a configuration access command. In this box, processor interface 111 of control hub 110 receives information from processor 120. Decoding and routing circuit 140 decodes the information to obtain the configuration address and the configuration access command. In some embodiments, the configuration address and the configuration access command are decoded from information sent at different times from processor 120.

The configuration address includes an identification of one of the target device 130. The configuration access command indicates the type of the configuration access such as a configuration read access or a configuration write access. Control hub 110 controls the transfer of data between processor 120 and the target device 130 in subsequent processes. Decoding and routing circuit 140 of control hub 110 routes the configuration address to configuration circuit 150.

In some embodiments, decoding and routing circuit 140 routes the configuration address of the target device 130 to be stored in CONFIG_ADDR register 152 based on different sequences. For example, in a decoding sequence, decoding and routing circuit 140 may decode the address information sent by processor 120 to identify which internal configuration register is referenced by processor 120. In another sequence, decoding and routing circuit 140 may route the data information associated with the address information to the internal configuration register (e.g., CONFIG_ADDR register 152) identified by the decoding sequence.

Box 220 writes the configuration address into CONFIG_ADDR register 152. The information represented by the configuration address specifies subsequent configuration access operation.

Box 230 initiates a configuration access. Based on the information stored in CONFIG_ADDR register 152, control hub 110 initiates a configuration access to access the target device 130. If the command in box 210 is a configuration read access, control hub 110 initiates a configuration read access to the target device 130. If the command in box 210 is a configuration write access, control hub 110 initiates a configuration write access to the target device 130.

Box 240 receives configuration data at control hub 110. The configuration data is sent to control hub 110 from either processor 120 or the target device 130. If the command in box 210 is a configuration read access, the configuration data is sent to control hub 110 from the target device 130 after the target device 130 is accessed. If the command in box 210 is a configuration write access, the configuration data is sent to control hub 110 from processor 120 before the target device 130 is accessed.

Box 250 transfers the configuration data. After the configuration data is received by control hub 110, the configuration data is propagated to data path circuit 160. The combination of the configuration address stored in CONFIG_ADDR register 152 and the configuration access command allows logic circuit 162 to enable data path circuit 160 to transfer the configuration data directly between processor 120 and the target device 130. If the command in box 210 is a configuration read access, data path circuit 160 passes the configuration data directly to processor 120 via data path 155 and processor interface 111. If the command in box 210 is a configuration write access, data path circuit 160 passes the configuration data directly to the target device 130 via path 156 and peripheral interface 113.

Method 200 shows that control hub 110 transfers data directly between processor 120 and the target devices 130 during a configuration access. For example, in the configuration read access, control hub 110 passes the configuration data (box 250) directly from the target device 130 to processor 120 without passing the configuration data to a data register commonly referred to as the configuration data register (CONFIG_DATA). As another example, in the configuration write access control hub 110 passes the configuration data (box 250) directly from processor 120 to the target device 130 without passing the configuration data to the configuration data register. In some embodiments, the configuration data register resides in an I/O address space starting at address value 0CFCh (hexadecimal) of processor 120.

The functions in boxes 210, 220, 230, 240, and 250 may be performed in a serial fashion or in a parallel fashion.

Figure 3:
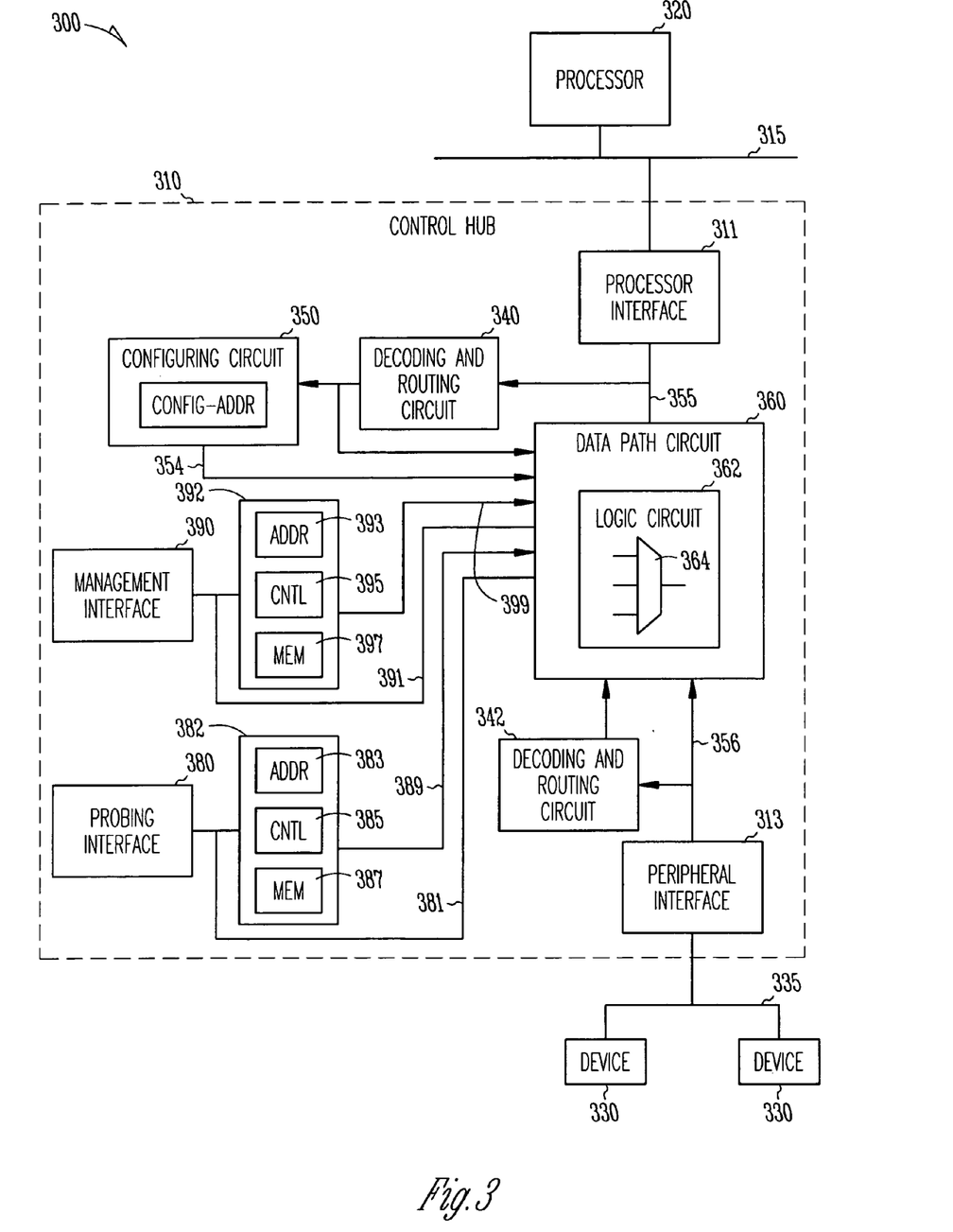
FIG. 3 shows a system having a control hub with a probing circuit and a management circuit.

FIG. 3 shows a system 300 having a control hub 310. Control hub 310 connects to a processor 320 via a processor bus 325. Control hub 310 also connects to a number of devices 330 via a peripheral bus 335. In some embodiments, peripheral bus 335 may be a PCI bus and devices 330 may be PCI devices. Control hub 310 controls the transfer of data between processor 320 and devices 330 via a processor interface 311 and a peripheral interface 313. Control hub 310 also includes a first decoding and routing circuit 340, a second decoding and routing circuit 342, a configuration circuit 350, and a data path circuit 360 connected to processor interface 311 via data path 355 and to peripheral interface via data path 356. During a configuration access, system 300 transfers data between processor interface 311 and peripheral interface 313 in a fashion similar to that of system 100 of FIG. 1. The components of FIG. 3 may be substituted by similar components of FIG. 1.

System 300 also includes a probing interface 380, a probing circuit 382, a management interface 390, and a management circuit 392. Logic circuit 362 includes a selection unit 364, which may be a multiplexer. Selection unit 364 selects one route among routes 354, 389, and 399 to transfer data from configuration circuit 350, probing circuit 382, or management circuit 392 to data path circuit 360 during an access. A data path 381 allows data received from data path circuit 360 to be routed to probing interface 380. A data path 391 allows data received from data path circuit 360 to be routed to management interface 390.

Probing circuit 382 includes an address register (ADDR) 383, a control register (CNTL) 385, and a memory unit (MEM) 387. Probing circuit 382 uses registers 383 and 385, and memory unit 387 to receive information inputted at probing interface 380 to access circuits and registers such as control hub 310 and devices 330 within system 300. The information received by probing interface 380 and probing circuit 382 includes configuration read access information, configuration write access information, memory read access information, memory write access information, IO read access information, IO write access information, interrupt information, and special cycle information. The configuration read or write access information may include configuration address such as bus number, device number, function number, and register number. In some embodiments, the configuration read access information, the configuration write access information, the interrupt information, and the special cycle information are defined by the PCI specification.

In some embodiments, probing interface 380 is compatible with the IEEE Standard 1149.1 Test Access Port (TAP) and Boundary-Scan Architecture (1990), supplemental IEEE standard 1149.1a-1993, and supplemental IEEE standard 1149.1b-1994. The IEEE 1149.1, the IEEE 1149.1a, or the IEEE 1149.1b standard is also referred to as the Joint Test Action Group Test Access Port (JTAG TAP) standard.

Probing interface 380 and probing circuit 382 provide an alternative route for control hub 310 to access circuit elements, registers, or other devices in system 300. The type of access though probing interface 380 and probing circuit 382 may be memory address access, IO address access, or PCI configuration address access. Probing interface 380 includes fewer pins than processor interface 311 or peripheral interface 313. Therefore, probing interface 380 and probing circuit 382 may allow a simpler hardware controller or software to communicate with probing interface 380 to access other parts or devices of system 300. Examples of the hardware controller includes add-in controller card inserted into a test computer and stand-alone programmer.

Management circuit 392 includes an address register (ADDR) 393, a control register (CNTL) 395, and a memory unit (MEM) 397. Management circuit 392 uses registers 393 and 395, and memory unit 397 to receive information inputted at management interface 390 to access circuits and registers such as control hub 310 and devices 330 within system 300. The information received by management interface 390 and management circuit 392 includes configuration read access information, configuration write access information, memory read access information, memory write access information, IO read access information, IO write access information, interrupt information, and special cycle information. The configuration read or write access information may include configuration address such as bus number, device number, function number, and register number. In some embodiments, the configuration read access information, the configuration write access information, the interrupt information, and the special cycle information are defined by the PCI specification.

In some embodiments, management interface 390 is compatible with the interface specified by System Management Bus (SMBus) version 2.0 (2000), published by Smart Battery System Implementers Forum.

Management interface 390 and management circuit 392 provides another alternative route for control hub 310 to access circuit elements, registers, or other devices in system 300. The type of access though management interface 390 and management circuit 392 may also be memory address access, IO address access, or PCI configuration address access. Management interface 390 includes fewer pins than probing interface 380, processor interface 311, or peripheral interface 313. Therefore, management interface 390 and management circuit 392 also allow a simpler hardware controller or software to communicate with management interface 390 to access other parts or devices of system 300.

In some embodiments, control hub 310 uses probing interface 380, probing circuit 382, management interface 390, and management circuit 392 to access different locations in system 300 to debug, test, or perform system management within system 300.

Figure 4:
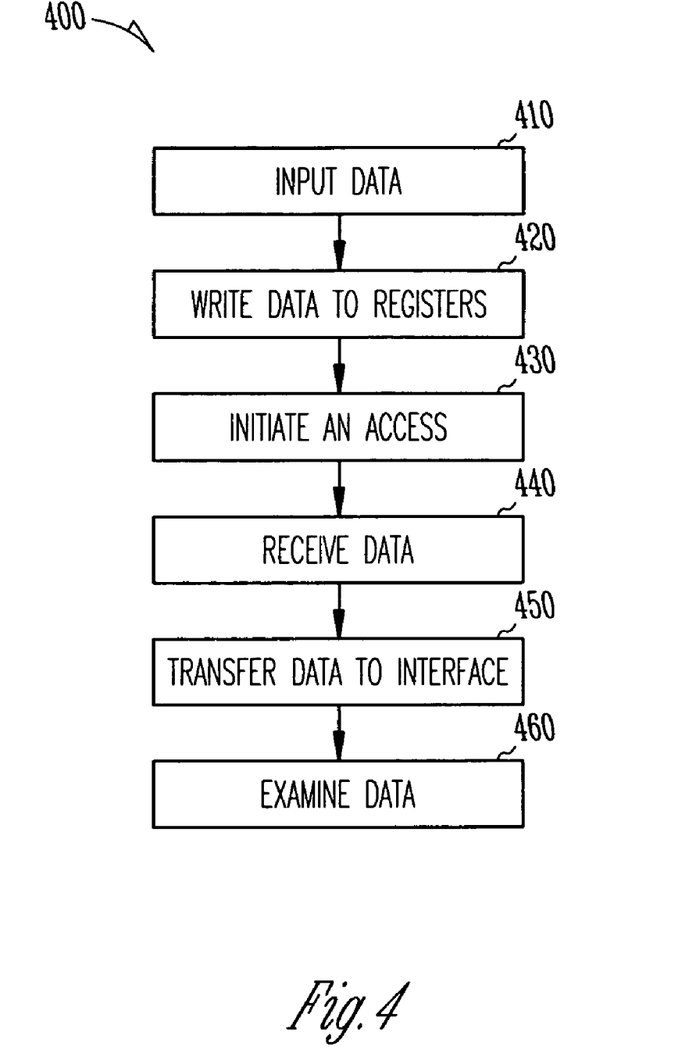
FIG. 4 is a flowchart of a method of accessing devices via different types of interfaces.

FIG. 4 is a flowchart of a method of accessing devices via different types of interfaces.

Box 410 inputs data via an interface. The interface in box 410 may be either probing interface 380 or management interface 390 of FIG. 3. The data inputted via the interface includes address information, control information, and data information. The data information in box 410 may be used for a write access to a peripheral device. The address information may include memory address, IO address, or PCI configuration address. The control information includes read or write access in the memory, I/O, and configuration address spaces. For example, the configuration address may include bus number, device number, function number, and register number. The control information may also include a configuration read or write access. The data information may include configuration data.

Box 420 stores the data inputted via the interface. If probing interface 380 is used to input the data in box 410, the data is stored in registers 383 and 385, and memory unit 387 of probing circuit 380. If management interface 390 is used to input data in box 410, the data is stored in registers 393 and 395, and memory unit 397 of management circuit 392.

Box 430 initiates an access based on the data stored in the registers of probing circuit 382 or management circuit 392. The type of access may be memory access, I/O access, or configuration access.

Box 440 receives data. The data in box 440 presents the data associated with the access in box 430. For example, the data in box 440 may be configuration data associated with a configuration address. The data may be the data read from a peripheral device during a read access.

Box 450 transfers the data to the interface. If probing circuit 382 is used during the access, the data is transferred from data path circuit 360 to probing interface 380. If management circuit 392 is used during the access, the data is transferred from data path circuit 360 to management interface 390.

Box 460 examines the data outputted by the interface. In some embodiments, the data may include system management information, test results or other information. A computer or a tester may be connected to probing interface 380 or management interface 390 to examine the data.

The functions in boxes 410, 420, 430, 440, 450, and 460 may be performed in a serial fashion or in a parallel fashion.

Figure 5:
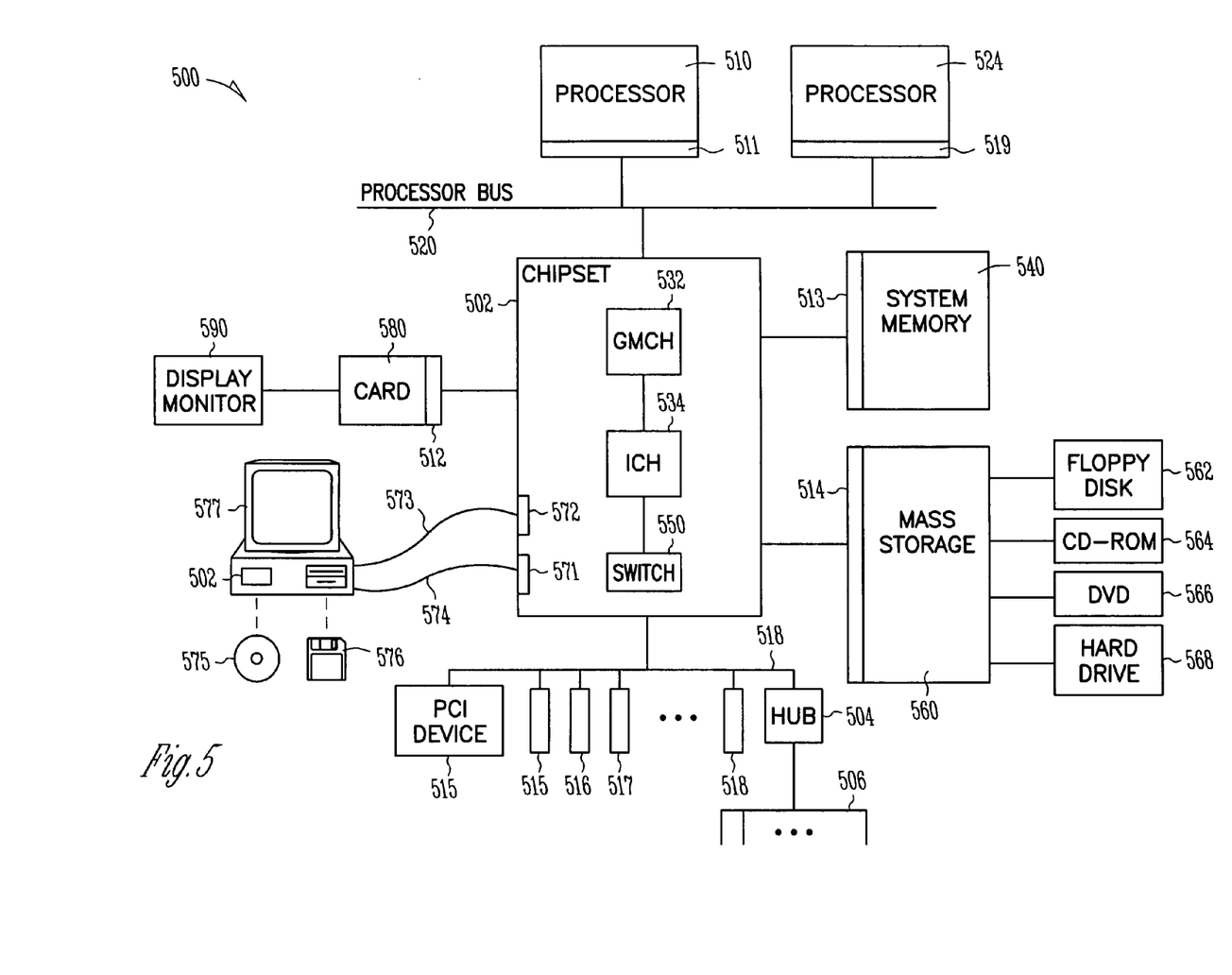
FIG. 5 shows a computer system.

FIG. 5 shows a system 500 including a chipset 502. A number of connectors 511–519 connect chipset 502 to a number of devices such as processors 510 and 524, a system memory 540, a mass storage device 560, a card 580 and a display monitor 590. System 500 also includes a device 505 connected to a peripheral bus 503. In some embodiments, peripheral bus is a PCI bus and device 505 is a PCI device. An additional peripheral bus 506 connects to peripheral bus 503 via a hub 504. In some embodiments, peripheral bus 506 is a PCI bus. System 500 further includes a probing circuitry 571 and a management circuitry 572. System 500 may include other devices of a computer which are not shown for clarity. All of the elements of system 500 may be located on a circuit board, for example, a motherboard.

Connectors 511–519 include ports, slots, sockets, or other interfaces that allow different devices to connect together. Each of the connectors 511–519 includes a number of connection points such as solder ball contacts and pins. At least one of the connectors 511–519 is configured according to an interface standard, for example, the PCI standard.

Chipset 502 may support one or more interfaces having a standard such as the PCI standard. Each interface defines a separate hierarchy domain. Each hierarchy domain may include a single endpoint or a sub-hierarchy containing one or more switch components and endpoints. Chipset 502 includes an integrated graphics and memory controller hub (MCH) 532, an I/O control hub (ICH) 534, and a switch 550.

MCH 532 provides control and configuration of memory and input/output (I/O) devices such as system memory 540 and the ICH 534. In some embodiments, MCH 532 includes a circuit to control integrated graphics memory. MCH 532 may include a number of interfaces such as PCI bus interface.

ICH 534 has a number of functionalities to support I/O functions. ICH 534 may include a number of interface and I/O functions such as PCI bus interface, processor interface, interrupt controller, direct memory access (DMA) controller, power management logic, timer, universal serial bus (USB) interface, mass storage interface, low pin count (LPC) interface, and others.

In some embodiments, switch 550 is a logical assembly of multiple virtual PCI-to-PCI bridge devices and appears to the configuration software as two or more logical PCI-to-PCI bridges. In some embodiments, switch 550 provides PCI interface to connectors 515–519.

FIG. 5 shows MCH 532 and ICH 534 as two separate blocks representing two separated integrated circuits or chips. In some embodiments, MCH 532 and ICH 534 may be integrated into one block representing a single integrated circuit or chip. In some embodiments, switch 550 may be located outside chipset 502.

Processors 510 and 524 represent central processing units of any type of architecture, such as embedded processors, mobile processors, micro-controllers, digital signal processors, vector processors, superscalar computers, single instruction multiple data (SIMD) computers, complex instruction set computers (CISC), reduced instruction set computers (RISC), very long instruction word (VLIW), or hybrid architecture.

A processor bus 520 provides interface signals to allow processors 510 and 524 to communicate with chipset 502 or with other processors and devices. Processor bus 520 may support a uni-processor or multiprocessor configuration. Processor bus 520 may be parallel, sequential, pipelined, asynchronous, synchronous, or any combination thereof. In some embodiments, system 500 includes a second processor bus similar to processor bus 520. In these embodiments, one or more processors similar to processors 510 and 524 may connect to chipset 502 via the second processor bus.

System memory 540 stores information such as system code and data. System memory 540 may include dynamic random access memory (DRAM) or static random access memory (SRAM). System memory 540 may include program code or code segments implementing one embodiment of the invention.

Mass storage device 560 stores information such as code, programs, files, data, applications, and operating systems. Mass storage device 560 may include machine-readable media such as a floppy disk 562, a digital video/versatile disc (DVD) 564, a compact disk Read Only Memory (CD-ROM) 566, and a hard disk 568, and any other magnetic or optical storage device.

Card 580 may be a digital display card such as a graphics card. Card 580 may contain devices that provide digital display signals to drive display monitor 590. Card 580 is plugged into or connected to connector 512 to interact with MCH 532 of chipset 502. In some embodiments, card 580 may be an Accelerated Graphics Port Digital Display second generation (ADD2) card.

Monitor 590 may be either an analog monitor or a digital monitor. For example, monitor 590 may be a flat panel display such as Liquid Crystal Display (LCD), electroluminescent display (ELD), gas-plasma display, a cathode-ray tube (CRT) display, or a television (TV) set. In some embodiments, card 580 is omitted and monitor 590 connects directly to connector 512 to interact directly with chipset 502.

Either one or both of the MCH 532 and ICH 534 of chipset 502 may include embodiments of a control hub such as control hub 110 (FIG. 1) or control hub 310 (FIG. 3) to provide memory address space access, I/O address space access, or configuration address space access as described in FIG. 1 through FIG. 4.

In some embodiments, probing circuitry 571 includes a probing interface and a probing circuit similar to probing interface 380 and a probing circuit 382 of FIG. 3. In some embodiments, management circuitry 572 includes a management interface and a management circuit similar to management interface 390 and a management circuit 392 of FIG. 3.

System 500 further includes an external computer 577 connected to probing circuitry 571 via line 574 and to management circuitry 572 via line 573. In some embodiments, external computer is a tester. External computer 577 receives instructions from a medium 575, a medium 576, or a hard disk 578. Medium 575 may be a CR-ROM or other optical media. Medium 576 may be a floppy disk. Hard disk 578 may include a magnetic material. Medium 575 or 576 or hard disk 578 includes instructions stored thereon to cause computer 577 to perform a method. The method may be used for purposes such as debugging, testing, or system management. In some embodiments, medium 575 or 576 or hard disk 578 includes instructions stored thereon to cause computer 577 to perform a method similar to method 400 of FIG. 4.

In FIG. 5, system 500 represents computers such as a desktops, laptops, hand-held devices, servers, Web appliances, and routers. In some embodiments, system 500 may be included in wireless communication devices such as cellular phones, cordless phones, pagers, and personal digital assistants. System 500 may also be included in computer-related peripherals such as printers, scanners, and monitors, or entertainment devices such as televisions, radios, stereos, tape and compact disc players, video cassette recorders, camcorders, digital cameras, MP3 (Motion Picture Experts Group, Audio Layer 3) players, and video games.

What is claimed is:

1. An integrated circuit comprising:
   an interface to transfer data with a first device;
   a configuration address register to store a configuration address of a second device during a configuration access; and
   a data path circuit to pass a configuration data associated with the configuration address between the first device and the second device during the configuration access without passing the configuration data to a configuration register.

2. The integrated circuit of claim 1 further comprising:
   a probing interface; and
   a number of first registers to store address and control information received from the probing interface during a first access in which the address includes an address type among memory address type, input/output (IO) address type, and configuration address type.

3. The integrated circuit of claim 2, wherein the probing interface is compatible with Joint Test Action Group Test Access Port interface (JTAG TAP).

4. The integrated circuit of claim 2 further comprising:
   a management interface; and
   a number of second registers to store address and control information received from the management interface during a second access in which the address includes an address type among memory address type, IO address type, and configuration address type.

5. The integrated circuit of claim 4, wherein the management interface is compatible with System Management Bus (SMIBus) interface.

6. The integrated circuit of claim 5 further comprising a memory unit to store data associated with one of the first access and the second access.

7. The integrated circuit of claim 6, wherein the data path circuit includes a selection unit to select data from among the interface, the probing interface, and the management interface.

8. The integrated circuit of claim 4, wherein the second registers are implemented as second PCI configuration registers.

9. The integrated circuit of claim 8, wherein the management interface is configured to provide access to the second PCI configuration registers.

10. The integrated circuit of claim 2, wherein the first registers are implemented as first PCI configuration registers.

11. The integrated circuit of claim 10, wherein the probing interface is configured to provide access to the first PCI configuration registers.

* * * * *

UNITED STATES PATENT AND TRADEMARK OFFICE
CERTIFICATE OF CORRECTION

PATENT NO. : 7,159,046 B2  Page 1 of 1
APPLICATION NO. : 10/881326
DATED : January 2, 2007
INVENTOR(S) : Mulla et al.

It is certified that error appears in the above-identified patent and that said Letters Patent is hereby corrected as shown below:

In column 10, line 23, in Claim 5, delete "(SMIBus)" and insert -- (SMBus) --, therefor.

Signed and Sealed this

Twenty-ninth Day of May, 2007

JON W. DUDAS
*Director of the United States Patent and Trademark Office*